July 6, 1965 A. J. SLEMMONS 3,192,692
ROTARY MOWER AND GRASS CATCHER
Original Filed Sept. 22, 1960 7 Sheets-Sheet 6
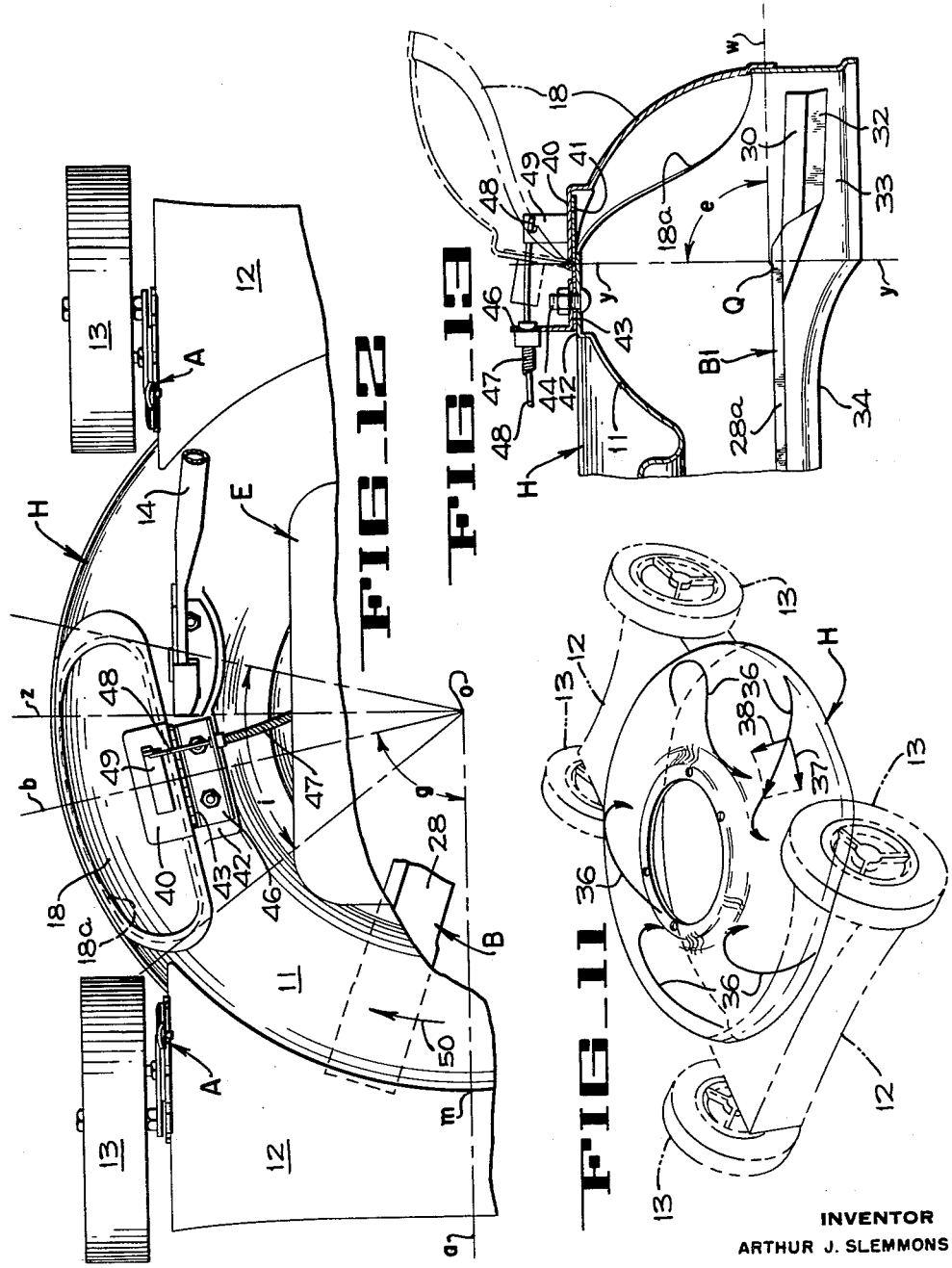
INVENTOR
ARTHUR J. SLEMMONS
ATTORNEY

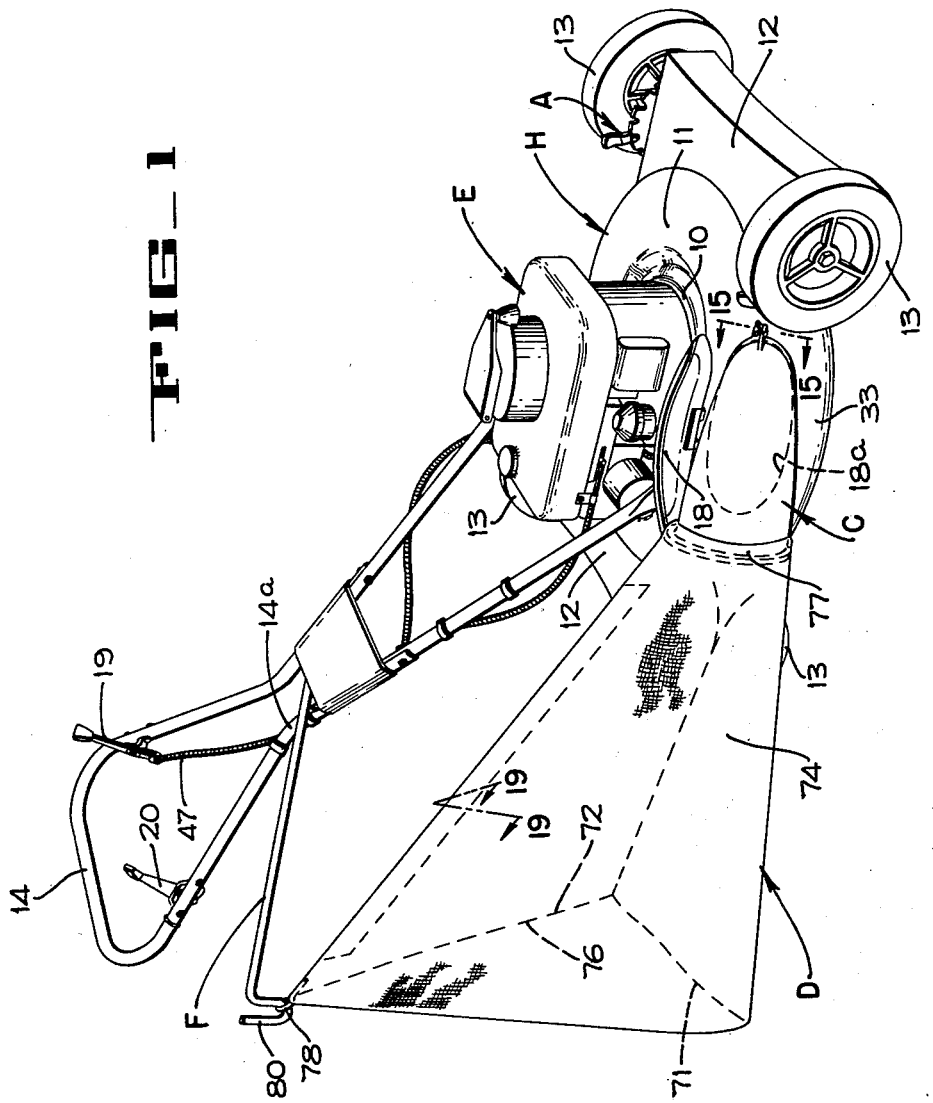

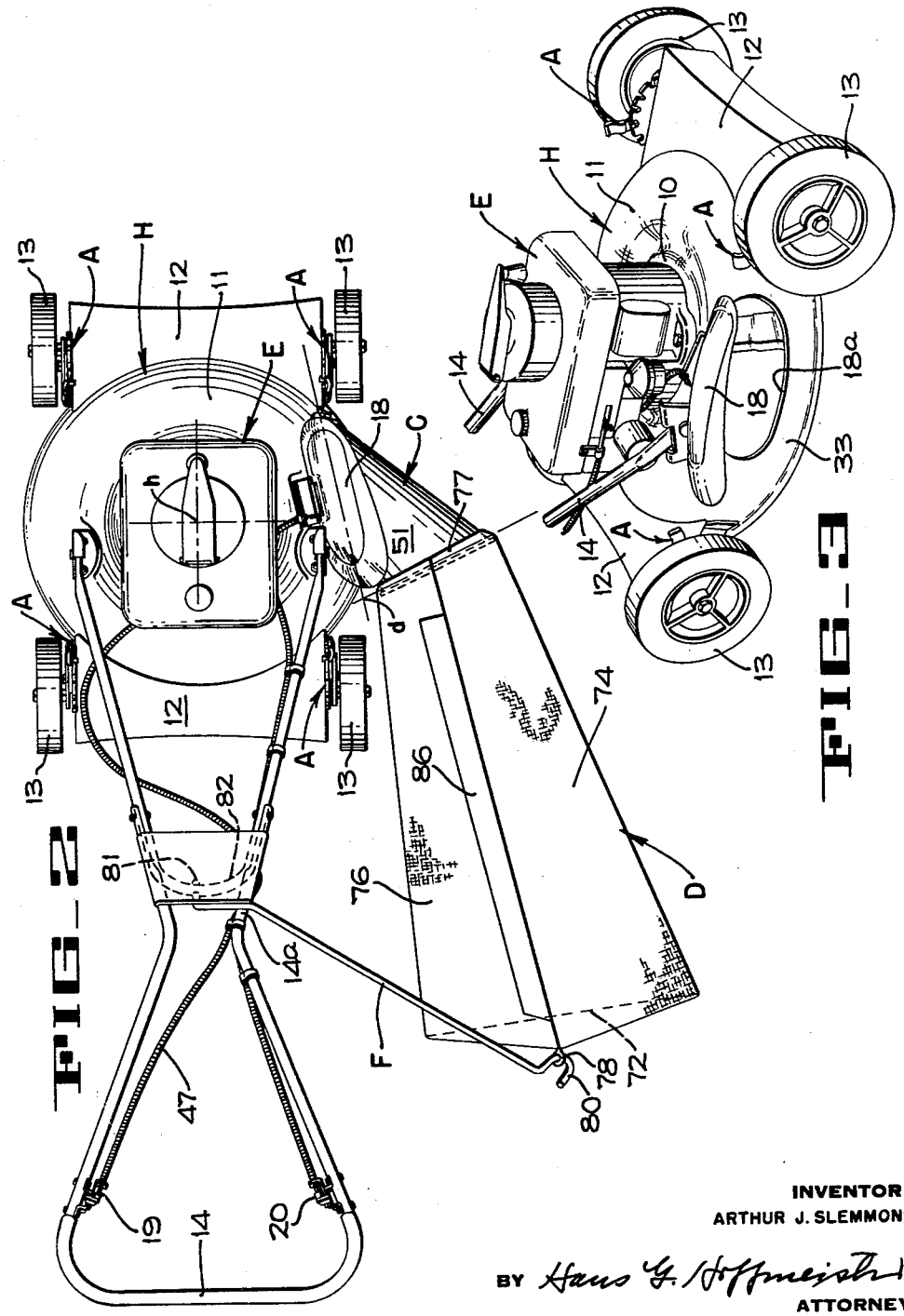

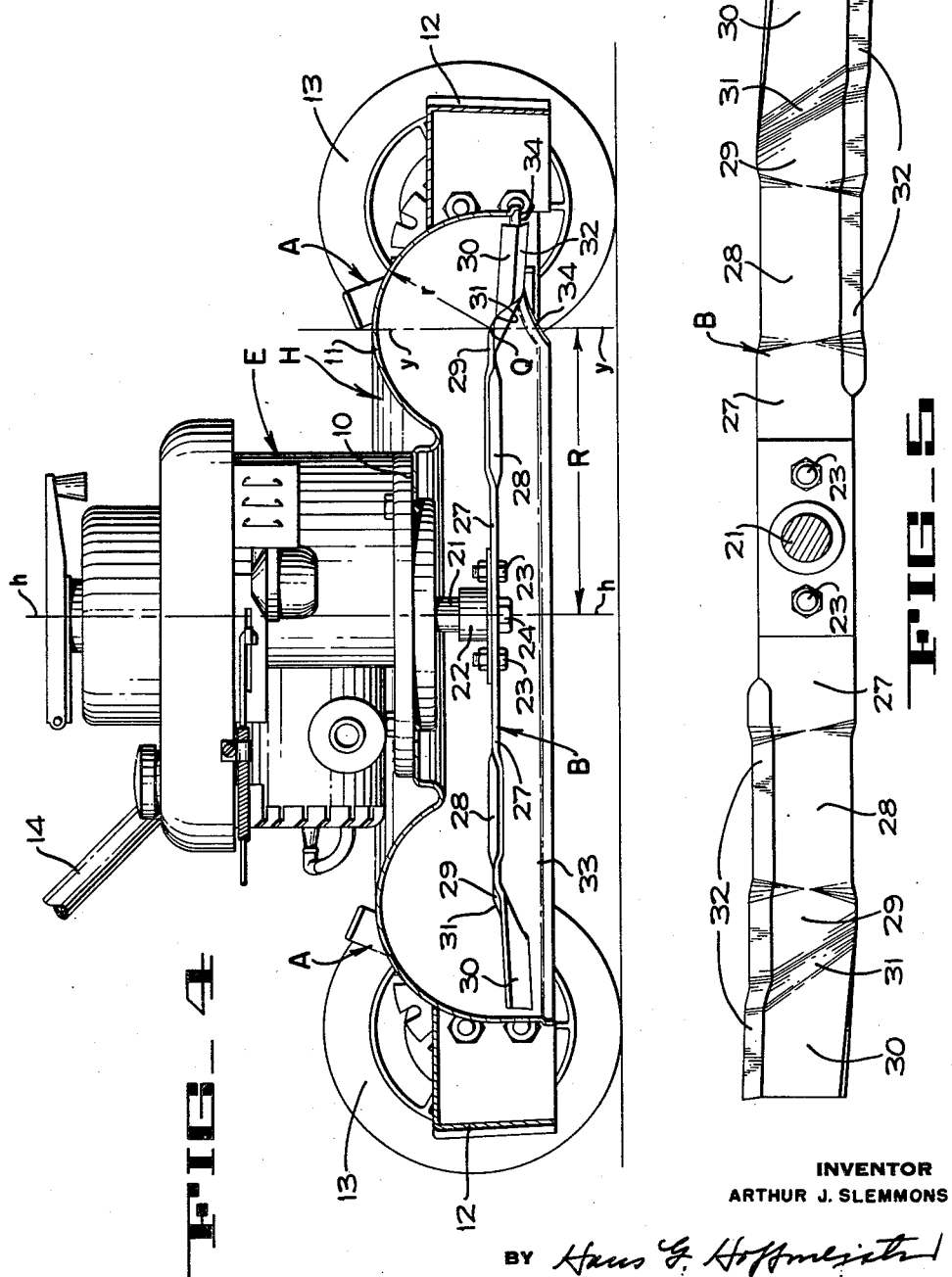

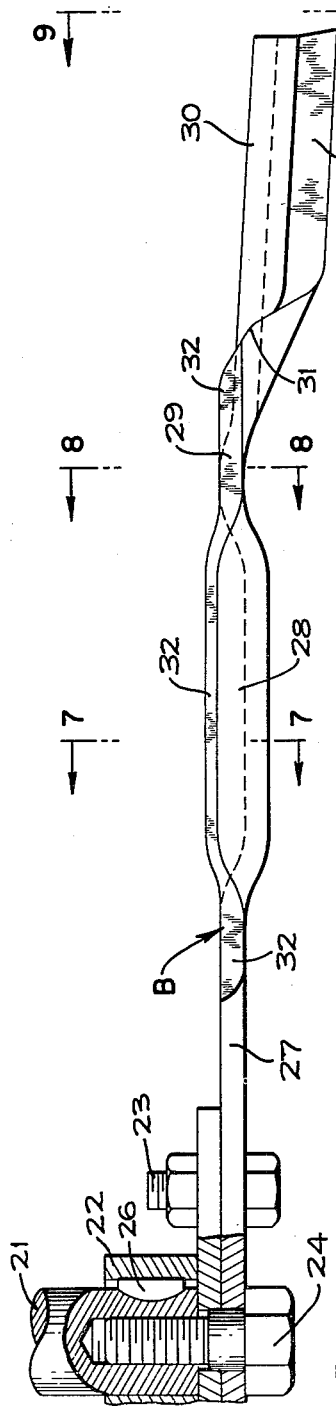
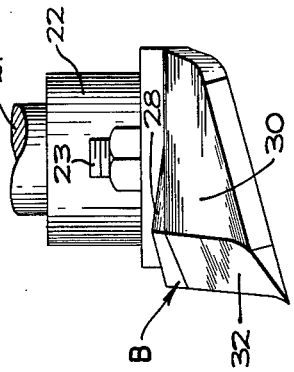
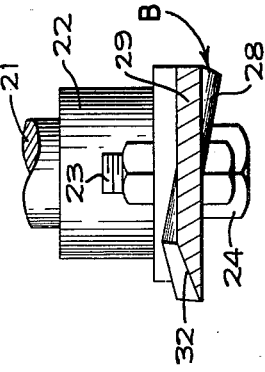
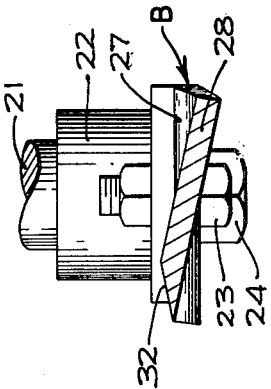
INVENTOR
ARTHUR J. SLEMMONS
BY Hans G. Hoffmeister
ATTORNEY

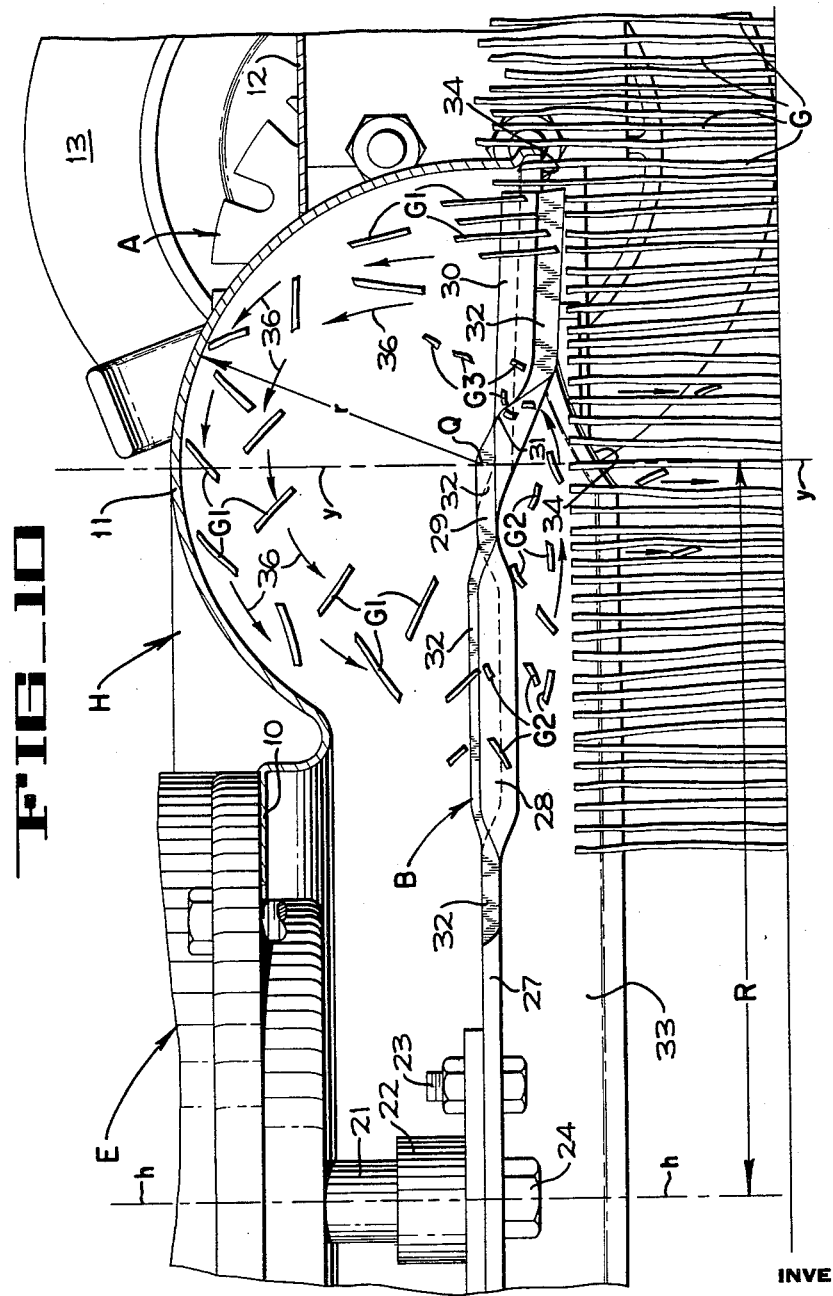

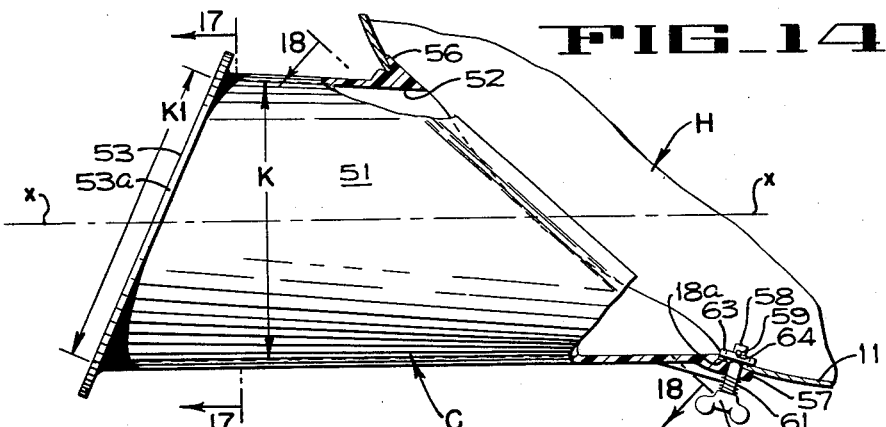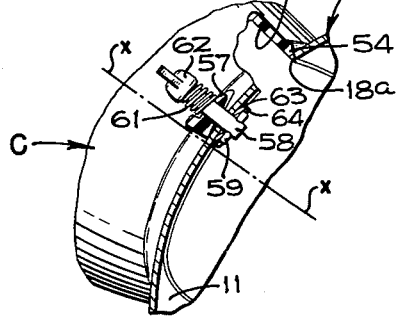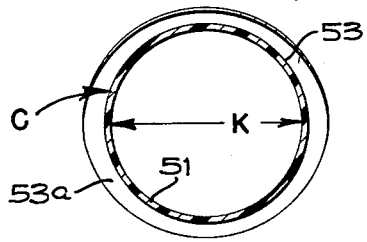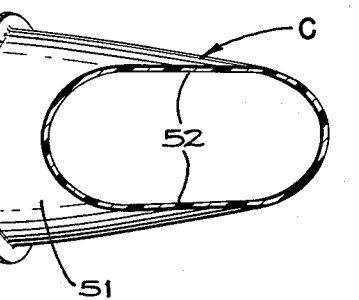

United States Patent Office 3,192,692
Patented July 6, 1965

3,192,692
ROTARY MOWER AND GRASS CATCHER
Arthur John Slemmons, Los Gatos, Calif., assignor to FMC Corporation, a corporation of Delaware
Original application Sept. 22, 1960, Ser. No. 58,602, now Patent No. 3,132,457, dated May 12, 1964. Divided and this application Feb. 25, 1963, Ser. No. 266,773
The portion of the term of the patent subsequent to Apr. 15, 1980, has been disclaimed
3 Claims. (Cl. 56—25.4)

This invention relates to a combined rotary mower and cutting collecting machine, the cutting collecting portion of the combination including a bag and means to mount the bag on the mower housing. This application is a division of the application of Arthur J. Slemmons, Serial No. 58,602, filed September 22, 1960, now Patent No. 3,132,457, for Rotary Mower and Grass Catcher, and assigned to the assignee of this divisional application. General objects of the invention are to improve the collection efficiency of the apparatus and to facilitate use of the apparatus. These general objectives can be resolved into several detailed, closely related objects which follow:

An object of the invention is to increase the ratio of the amount of grass collected by the collecting bag to the amount of grass that is deposited on the terrain. This ratio may be termed the "collection efficiency." Stated differently, it is an object of the invention to increase the collection efficiency of the mower and cutting collecting combination.

Another object of the invention is to facilitate use of the apparatus by making it possible to mow a large area before it becomes necessary to empty the collecting bag.

Another object is to locate the cutting discharge opening formed in the mower housing in the zone of maximum collection efficiency, with the bag being mounted in a convenient position.

These objects are accomplished by a rotary mower and cutting collecting assembly wherein the mower housing is of semitoroidal form and the blade is formed to cause a relatively vigorous circulation and recirculation of the cuttings, resulting in a cutting and recutting, or comminuting action on the cuttings. This cutting and recutting of the cuttings results in delivery of a relatively large percentage of the cuttings to the collecting bag, and so provides a high collection efficiency.

One of the most annoying characteristics of prior rotary mower and grass collecting combinations has been the necessity for frequent emptying of the collecting bag. In the mower and cutting collecting combination of this invention, the cutting and recutting action referred to has been found to provide an unexpected improvement in the relationship of the area that is cut to the number of times the bag must be emptied.

Another object of the invention that facilitates use of the device is to facilitate the mounting and dismounting of the bag on the mower. In accordance with the invention, a tubular chute is provided for mounting over a discharge opening in the mower housing. The outlet mouth of the chute is inclined to the major axis of the chute, and is elliptical. With this construction, a bag having an inextensible inlet throat of the proper size can be readily slipped over the discharge end of the chute, and the throat of the bag will become self-tightening or self-gripping on the chute when the throat is pulled toward a flange surrounding the inclined outlet mouth of the chute.

Another object of the invention is to simplify the collecting bag emptying and closing procedure. This is accomplished by making the bag in such form that no mechanical means are required to close it. To this end, an overlapping seam is formed along the upper edge of one side wall of the bag, which seam overlaps and hugs the other side wall when the bag is mounted on the chute at one end and supported under tension from the handle bars of the mower at the other end.

The manner in which these and other objects of the invention may be obtained will be apparent from the following detailed description of the invention:

FIGURE 1 is a perspective of the mower and cutting collecting assembly of the invention.

FIGURE 2 is a plan of the mower and cutting collecting assembly.

FIGURE 3 is a perspective of the mower with the cutting collecting assembly removed.

FIGURE 4 is a vertical medial section through the mower housing, the driving motor for the mower being shown in side elevation.

FIGURE 5 is a plan of the cutting blade.

FIGURE 6 is a fragmentary edge elevation of the blade.

FIGS. 7 and 8 are sections of the blade taken along lines 7—7 and 8—8, respectively, of FIG. 6.

FIG. 9 is an end view of the blade viewed in the direction of arrows 9—9 of FIGURE 6.

FIGURE 10 is a view of one-half of the blade and housing assembly, showing diagrammatically the interaction of the blade and housing on the cuttings.

FIGURE 11 is a diagrammatic simplified perspective of the mower housing, with arrows drawn thereon indicating the circulating action imparted to the cuttings.

FIGURE 12 is a fragmentary plan of the mower showing the door for the cutting discharge opening.

FIGURE 13 is a fragmentary section through the mower housing at the discharge door, illustrating in elevation a part of a modified form of cutting blade.

FIGURE 14 is a fragmentary horizontal section through the mower housing, showing the mounting of the collecting chute on the housing.

FIGURE 15 is a fragmentary transverse section taken on line 15—15 of FIGURE 1 and showing further details of the chute mounting.

FIGURE 16 is a fragmentary bottom elevation showing the chute mounting rod and pin.

FIGURES 17 and 18 are sections of chute taken on lines 17—17 and 18—18 of FIGURE 14, respectively.

FIGURE 19 is a fragmentary section of the bag taken on line 19—19 of FIGURE 1.

The principal elements of this specification will be presented as follows:

First the general arrangement of the parts will be outlined; next the housing and blade construction will be described, followed by a description of the collecting chute and bag assembly, and a statement of how the chute is mounted on the mower and how the bag is mounted on the chute. Finally, the operation of the mower and its interrelation with the collection apparatus will be explained.

*General arrangement*

The assembled rotary mower and cutting collecting unit is shown in FIGS. 1 and 2. The main frame of the mower is in a form of a housing H having a flat contral portion 10 to which an internal combustion engine E is bolted, and a semitoroidal portion 11 which cooperates with the cutting blade B (FIG. 10) to cause a circulating recutting action on the cuttings. Supporting wheels 13 are rotatably mounted on aprons 12 rigid with the front and rear portions of the housing. As seen in FIGS. 1–3, 12 and 13, a door 18 is provided for a cutting discharge opening 18a formed in the housing H, and mounted on the housing in communication with the discharge opening 18a is a tubular cutting collecting chute C which in turn supports a seam 77 forming the inlet throat of a cutting receptacle D, the receptacle being in the form of a porous fabric bag. The discharge opening 18a in the housing is shown in FIG. 3 with the chute removed. The door 18 may be opened or closed by a control 19 mounted on the mower handle. As seen in FIGS. 1 and 2, the rearward upper corner of the collecting bag is supported by an arm F extending from the mower handle 14. A throttle control 20, terminates at the upper portion of the handle. Suitable height adjustment mechanism A is provided for raising and lowering the wheels relative to the mower housing for adjusting the cut of the mower.

The housing and blade construction

The mower housing and blade assembly is described and claimed in and of itself in my copending application Serial No. 9,040, filed February 16, 1960, now Patent No. 3,085,386, entitled "Rotary Lawnmower" and assigned to the assignee of the present application. However since there is an advantageous cooperation between the mode of operation of the mower housing and blade assembly and that of the cutting collecting unit, the mower housing and blade assembly will be described herein in some detail.

Referring to FIGS. 4 and 10, the semitoroidal portion 11 of the housing has an internal surface that is generated by a generally semicircular generatrix, to be described in more detail presently. When the generatrix is rotated about the major vertical axis $h$—$h$ of the housing, which is the axis of blade rotation, the internal surface of the semitoroidal housing portion 11 can be said to be generated or developed.

As seen in FIG. 6, the engine shaft 21 mounts a rotary cutting blade B. The blade is bolted to a hub member 22 by means of bolts 23. The hub member slips over the end of engine shaft 21, and is retained on the shaft by a central bolt 24. A driving key 26 is provided between the hub and the engine shaft 21. The blade is rotationally symmetrical about the axis of its drive shaft 21.

Details of the blade construction are shown in FIGS. 5–9. The blade is pressed or forged from a flat spring steel strip. The blade has a flat central portion indicated generally at 27 which is bolted to the hub 22. Extending from the flat central portion 27 of the blade are what will be termed intermediate blade portions 28, and in the form of blade being described, the intermediate blade portions 28 are inclined downwardly in the direction contrary to that of blade rotation. Radially outward of the intermediate portions 28 of the blade are transitional portions 29, from which extend end portions 30. The end portions 30 of the blade are inclined upwardly in the direction contrary to that of blade rotation, so that the end portions 30 and the intermediate portions 28 are oppositely inclined. The end portions 30 of the blade perform the initial cutting operation. Diagonally disposed transitional bends 31 (FIG. 5) join the end portions 30 of the blade with the transitional portions 29. As best seen in FIG. 5, the majority of the blade is forwardly sharpened at 32.

The geometry of the housing H relative to the construction of the blade plays an important part in the collection of the cuttings in accordance with the present invention. As seen in FIGS. 4 and 10, the semitoroidal portion 11 of the housing H has a generatrix in the form of a semicircle of radius $r$. The semicircular generatrix has a vertical axis $y$—$y$ passing through its center Q. The center of the generatrix and its vertical axis $y$—$y$ are displaced from the axis of rotation $h$—$h$ of the blade, which corresponds to the major axis of the housing, by a radius R. In other words, R is the radius of the path of the vertical axis $y$—$y$ of the semicircular generatrix as the generatrix sweeps around the blade axis to generate the semitoroidal internal surface of the housing. The inclined end portions 30 of the blade sweep under the major part of the outer peripheral half of the semitoroidal portion of the housing, i.e., the part lying radially outward of axis $y$—$y$.

For best performance the radius $r$ of the semicircular generatrix of the semitoroidal housing portion 11, and the radius R of the path of the vertical axis $y$—$y$ of the generatrix will have substantially a certain predetermined ratio, R/$r$. It has been found that the most effective cutting and circulating action is provided when the ratio R/$r$ is substantially equal to 2.5.

As previously stated and as seen in FIGS. 4 and 10, all portions of the effective cutting edges of the inclined end portions 30 of the blade lie outside the circular path of the vertical generatrix axis $y$—$y$. Because of this disposition of end portions 30 of the blade, material that is cut by the end portions of the blade and lifted because of the inclination of the end portions, strikes the housing wall at an acute angle of incidence, i.e., its line of approach to the housing wall forms an acute angle with a tangent to the housing at the point of impact, and hence the cut material is deflected from the wall at the point of impact by an angle of deflection that is also an acute angle. Thus, the material is not compacted on the wall of the housing but is circulated around the housing to be re-cut by the intermediate blade portions 28. This action is described in more detail in the section of the specification that describes the operation of the device. As seen in FIGS. 4, 10 and 13, the semicircular toroidal portion 11 of the housing is skirted as at 33 to provide a blade guard. The forward portion 34 of the housing is not skirted to permit entry of the uncut grass to the interior of the housing.

Collecting chute and bag assembly

As previously mentioned in the general description, this assembly includes a tubular chute C and a collecting bag D. The construction of the chute and its mounting on the mower housing are shown in FIGS. 14–18. The chute has a generally tubular body 51 which body is ellipsoidal in section. The chute has an inlet mouth 52 for cooperation with the discharge opening 18a of the mower housing, and an outlet mouth 53 for mounting the inlet throat of the collecting bag D. The outlet mouth 63 is surrounded by an outwardly extending flange 53a, and this flange, and hence the outlet mouth of the chute, is inclined to the major chute axis $x$—$x$ (FIG. 14) by an angle of about 67°.

The inlet mouth 52 of the chute is formed with a generally conical outer surface 54 that forms an air seal with the discharge opening 18a in the housing (FIGURE 15). The entrance mouth of the chute is inclined to the major axis $x$—$x$ of the chute by an angle of about 45°. As seen in FIG. 2, the inclinations of the inlet and exit mouths of the chute result in the bag extending rearwardly substantially parallel to the fore and aft mower axis. The planes of the inlet and outlet mouths of the chute intersect in an approximately vertical line $d$ (see FIG. 2) that is disposed rearwardly of the axis $h$—$h$ of the housing and laterally outward from the side of the housing in which the discharge opening 18a is provided.

In order to mount the chute on the mower housing, a hook 56 is formed at the rearward edge of the inlet mouth of the chute, which hook can be slipped through the opening 18a to engage the inner surface of the mower housing. The opposite or forward edge of the inlet mouth of the chute is secured on the housing by means of a lug 57 (FIGS. 14–16) extending along the outer surface of the housing. Mounted in the lug is a latch rod 58 having a transverse pin 59 at its inner end. There is a spring 61 on the outer end of the rod under compression between the lug 57 and a wing nut 62 on the rod. Welded to the undersurface of the housing is a pad 63. The housing and pad are apertured to receive the mounting rod 58. The pad has a shallow groove 64 to receive the pin 59 and the housing and pad are formed with a keyhole slot 66 to permit insertion of the pin 59. In order to mount the chute on the mower, the hook 56 of the chute is slid underneath the housing wall, the wing nut 62 is grasped and rod 58 turned in order to align the pin 59 with keyhole slot 66 in the housing and the pad. Now by compressing the spring 61 the pin 59 can be pushed through the keyhole slot, after which the rod 58 is given a quarter turn, whereupon the spring 61 urges the transverse pin 59 into the groove 64 in the pad 63. This securely mounts the chute on the mower housing.

The construction of the bag appears in FIGS. 1, 2, and 19. The bag is semipyramidal in form and has a bottom wall 71 that is relatively flat, a triangular rearward end wall 72, and substantially flat outside and inside walls 74 and 76 respectively. The inside, outside, and bottom walls of the bag merge at the forward end of the bag into an inlet mouth that is seamed at 77, the seam being relatively inextensible. At the rearward upper corner of the bag, where the triangular end wall and the side walls of the bag meet, is an eyelet 78. The rearward upper corner of the bag is supported by the arm F having a hooked portion 80 at its free end for receiving the eyelet 78. As indicated in FIG. 2, the arm F is mounted on the mower handle 14 by inserting a terminal leg 81 of the arm through an aperture formed in a cross bar 82 forming part of the mower handle structure. The portion of arm F adjacent leg 81 crosses and rests upon the bar 14a that constitutes the right side of the mower handle 14.

An opening is provided for emptying the bag, and means are provided to make the opening self-closing. No fasteners are required to close the opening. This facilitates ready emptying of the bag. As seen in FIG. 19, which is a fragmentary section through the upper edge of the bag, i.e., the edge formed by the juncture of the inside and outside walls 74 and 76, the upper edge of the inside wall 76 is seamed as at 85. The upper edge of the outside wall 74 has an extension in the form of a flap 86, the edge of which is seamed at 87. When the bag is mounted on the chute and when the eyelet 78 is hooked to the mounting bar F, the upper edge of the bag is under sufficient longitudinal tension to cause flap 86 to hug or press against inner side wall 76 and so close the opening that is provided along the upper edge of the bag.

Because of the circulating action of the blade and mower housing assembly, a stream of air, bearing entrained cuttings, is blown into the bag, so that the bag must be made to permit air to pass through its walls. Therefore, at least the side walls of the bag are made of fabric having a relatively open mesh canvas material. The bottom wall may be reinforced or lined and need not be porous.

It has been stated that the seam 77 at the entrance mouth of the bag can be made substantially inextensible. This construction, which does not require drawstrings or closure members at the seam, is made possible by the shape of the outlet mouth portion 53 of the chute. The chute is ellipsoidal in section, and in the embodiment illustrated, (FIGURES 14 and 17) the section of the chute taken perpendicular to the chute axis $x$—$x$ is substantially a circle. As also seen in FIGS. 14 and 17, this section of the chute has a diameter perpendicular to the chute axis that is indicated at K. The flange 53a formed at the outlet mouth 53 of the chute is inclined to the major axis $x$—$x$ of the chute by the angle of 67° previously mentioned. Because of this inclination the section of the chute taken at the flange 53a is elliptical, and hence has a major diameter K1 that is larger than the diameter K which is perpendicular to the axis of the chute. For example, with the outlet mouth inclined to the chute axis at the aforesaid angle of 67° and with an outlet mouth having a diameter K of 6 inches, the circumference of the chute at diameter K will be approximately 19 inches, whereas the circumference of the chute taken at flange 53a at diameter K1, will be approximately 20½ inches. With this construction, the seamed relatively inextensible throat 77 of the bag is formed to have a circumference that is substantially equal to but slightly larger than the circumference of the chute taken at diameter K, for example the seam may have a circumference of 19½ inches.

In installing the bag on the chute, the seam 77 is first hooked over the outer or right hand side of flange 53a, and the bag is held so that the seam 77 is parallel to the diameter K, as such diameter is indicated in FIG. 14. In other words, the seam 77 is held perpendicular to the chute axis $x$—$x$. In this manner the seam 77 of the bag can be slipped over the flange 53a, whereupon it comes to rest substantially snugly around the cylindrical section of the chute at diameter K of the chute. Now when the eyelet 78 at the other end of the bag is slipped over hook 80 of the rod F, the upper longitudinal edge of the bag is taut, which applies tension to the seam 77. Such tension causes the seam 77 to ride along the surface of the chute until the seam is brought up against the flange 53a. Since the diameter of the chute along the elliptical section having major diameter K1 (FIG. 14) is greater than that of the circular section K, this shifting of the seam along the chute causes the seam to grip the chute. Thus, although the seam 77 can be readily slipped over the flange 53a of the chute, the seam becomes tight on the chute when the mounting of the bag is completed, and flange 53a is in itself sufficient to prevent dislodgement of the bag from the chute. Thus, the mounting operation is a simple one, as is that of dismounting the bag, because no drawstrings need be tied or untied, and no fasteners need to be manipulated. Furthermore, the seam 77 provides a strong, long lasting construction for the mouth of the bag, as compared to a construction employing a drawstring, the life of which is short.

*Operation of mower and inter-relation with the collecting assembly*

The combined cutting, circulating, and recutting action of a mower of this invention is illustrated in FIG. 10, and the dynamic circulating action that takes place around the housing is indicated diagrammatically in FIG. 11. The inclined end portions 30 of the blade sever the uncut grass G into lengths G1. Since the blade ends 30 are inclined upwardly in the direction contrary to that of blade rotation the cut material G1 is given compound motion, as indicated by the arrows 36 of FIG. 10. These arrows are also shown three-dimensionally in FIG. 11. Referring to the latter figure, the tangential or circumferential component of the motion of the cuttings, resulting directly from blade rotation is indicated by the arrow 37. The vertical component of such motion, resulting from the inclination of the ends 30 of the blade is indicated by the arrow 38. These motions are combined and result in a generally helical circulatory motion of the cuttings, as indicated by the arrows 36 in FIG. 11.

The internal surface of the housing deflects the rapidly moving cut material, as it is flung from the ends 30 of the blades, causing the material to move generally upward and around the outer half of the internal surface of the toroidal housing portion 11, and generally down and around the inner half of the internal surface of the housing. Likewise, the end portions 30 of the blade act as a fan and impart a corresponding motion to a stream of air, which stream entrains the cuttings and assists in their circulation. This action takes place entirely around the housing as indicated in FIG. 11.

As previously mentioned, in additon to being shown three-dimensionally in FIG. 11, the paths 36 of the cut material and of the air stream are indicated by the arrows 36 (in a foreshortened manner) in FIG. 10, which figure illustrates the cutting and recirculating action imparted to the grass cuttings. Because of the recirculating action just described, the initially cut lengths of grass G1 are deflected downwardly into the path of the intermediate blade portions 28. When this occurs, the lengths of initially cut material G1 are recut into shorter lengths G2. Many of the recut pieces or shorter lengths G2 are recirculated, in that they are drawn back past the leading edges of bend portions 31 of the blade, to be further recut by ends 30 of the blade into still shorter lengths G3. This circulating and recutting action is augmented by the inclination of intermediate portions 28 of the blade, which, as previously mentioned, are inclined downwardly in the direction contrary to that of blade rotation. Thus, intermediate blade portions 28 provide a reversed fan action that draws the cut material downwardly around the inner peripheral half of the housing and into the path of the sharpened edges of the intermediate blade portions 28. As previously mentioned, because of the radial disposition of the end portions 30, and the intermediate blade portions 28 relative to the axis y—y of the generatrix, the cut material tends to move along the inner surface of the housing and is not impacted upon the housing wall.

When the door 18 is open and the chute C and collecting bag D are installed, the circulating and recutting action just described provides efficient collection of the cuttings. Since the material is cut, recut, and recut again, the collected material is comminuted so that the cuttings are small or fine. It has been found that when cuttings of this nature are blown into the bag there is a substantial increase in the area that can be mowed before the bag need be emptied, in comparison with prior rotary mowing and cutting collecting assemblies, wherein the circulating and recutting action characteristic of the mower of this invention is not present. Some of the cuttings, namely those that are initially cut ahead of the discharge opening 18a, will be blown directly into the bag as single cut cuttings G1. However, those cuttings that are not so discharged are recirculated and recut as described, so that on the whole, the cuttings that are not so discharged are recirculated and recut as described. In general therefore, the cuttings that are collected in the bag are relatively fine.

In a modified form of the invention, shown in FIGURE 13, the intermediate portions 28a of the blade B1 are sharpened but are not inclined. With this construction the intermediate portions 28a of the blade will perform a recutting action because the velocity imparted to the cut material and to the air stream by the end portions 30 of the blade, insures that most of the cut material will be deflected downwardly around the inner peripheral half of the semitoroidal portion 11 of the housing and into the path of the intermediate blade portions 28a, which will then recut the cuttings. Most of the cuttings that are not blown directly into the collecting bag will be recirculated to find their way into the bag.

The center of the discharge opening 18a is positioned circumferentially of the housing in a location that facilitates most efficient collection of the cuttings, when the mower is propelled in a forward direction. As seen in FIG. 12, this location has been found to be one wherein the center of the discharged opening 18a lies along line o—b, which is circumferentially displaced by an angle g of 78° from the forward mid-point m of the housing H, which mid-point lies on the fore and aft mower axis o—a. In other words, the center line o—b of the discharge opening is disposed relatively close to a line o—z that represents the terminal boundary of the first quadrant of the mower housing through which an end of the blade B passes after departing from the forward mid-point m. The direction of blade rotation is indicated by the arrow 50 in FIGURE 12. With the discharge opening 18a circumferentially disposed in the aforesaid position, the mounting of the bag in a convenient, out of the way position is facilitated by the construction of the chute C, wherein the entrance mouth is inclined to the chute axis by an angle of about 45°. However, because of the circulating action imparted to the cuttings, the location of the discharge opening 18a relative to the front of the mower is not as critical as it would be with a mower that does not provide circulation about the entire circumference of the housing. As seen in FIG. 12, the opening 18a is of oval shape and subtends an angle i in the horizontal plane of about 45°.

The position of the discharge opening in the vertical plane is indicated in FIG. 13. The upper edge of the discharge opening is at the intersection of the generatrix axis y—y with the top or zenith of the housing, and the opening encompasses a vertical angle e between the generatrix y—y and a horizontal line q—w, of about 90°. Thus the opening occupies about ⅔ of the extent of the outer half of the housing in the vertical plane. With this location of the discharge opening in the vertical plane, the opening receives cuttings that still retain most of the kinetic energy initially imparted thereto by the inclined end portions 30 of the blade. Also, the velocity of the propelling air stream generated by the inclined ends of the blade is substantially at a maximum when the air stream reaches the discharge opening.

Although it does not form part of the present invention, and is described in detail and is claimed in my aforesaid copending application, the mounting of discharge door 18 will be briefly described. It is illustrated in FIGS. 12 and 13. The door 18 is shaped to correspond to the housing contour and merges with it smoothly. In order to mount the door 18 for hinged movement, a small section of the upper portion of the door 18 is flattened or embossed slightly at 40. A hinge leaf 41 is welded to the underside of the flattened portion 40. The housing portion 11 is also embossed slightly at 42 and the other hinge leaf 43 is mounted thereon by bolts 44. These bolts also mount an angle bracket 46, to which is secured the flexible guiding sheath 47 for a control wire 48. One end of the wire 48 connects to an angle bracket 49 welded to the top of the door, and the other end of the wire 48 connects to the handle control lever 19 (FIG. 1), conveniently located on the mower handle 14 for remote opening of the door.

The invention having been described in detail, it can be seen that the mower and cutting collecting combination of the invention provides a high degree of collection efficiency and facilitates the use of the apparatus. A large area can be mowed before the bag need be emptied, and removal of the bag, emptying of the bag, and replacement of the bag on the mower is a simple, readily accomplished operation. The discharge opening is located for optimum collecting efficiency, and the chute makes possible this location while mounting the bag in a convenient location.

While a particular embodiment of the present invention has been shown and described it will be understood that the rotary lawnmower and grass catcher assembly of the invention is capable of modification and variation without departing from the principles of the invention and that the scope of the invention should be limited only by the scope and proper interpretation of the claims appended hereto.

The invention having thus been described, what is claimed and desired to be protected by Letters Patent is:

1. A combined rotary mower and cutting collecting assembly comprising a housing having a thin walled cutting deflector portion, said deflector portion having a regular semitoroidal internal surface, said housing deflector portion being circumferentially continuous and being of uniform radial width and contour around its entire circumference, a blade, means mounting said blade for rotation about the major housing axis, and means for rotating said blade, said blade having forwardly sharpened end portions inclining inwardly in a direction contrary to the direction of blade rotation, said upwardly inclining end portions of the blade lying within the outer peripheral half of said housing deflector portion, said blade having forwardly sharpened intermediate portions lying within the inner peripheral half of said housing deflector portion, said end portions of the blade cutting material and imparting both a tangential and an upward velocity to the cut material, said housing deflector portion deflecting the cut material around its internal surface and downward into the path of the intermediate blade portions, said intermediate blade portions further cutting the cut material, said end portions of the blade causing re-circulation of a substantial portion of said re-cut material within the outer peripheral half of said housing deflector portion, said deflector portion having a cut material discharge opening formed in the outer peripheral half thereof, said opening lying entirely within the confines of said deflector portion with the edge of said opening being circumferentially continuous, a porous collecting bag, and means for mounting said bag for receiving cuttings that are blown through said discharge opening.

2. The assembly of claim 1, wherein the center of said discharge opening is circumferentially displaced from the forward mid-point of the housing deflector portion in the direction of blade rotation and lies in the first quadrant of the housing adjacent the 90° boundary of the quadrant, and wherein the upper edge of said discharge opening is disposed substantially at the top of said housing deflector portion, and wherein the opening encompasses substantially ⅔ of the extent of the outer peripheral half of the housing deflector portion in the vertical plane.

3. A combined rotary mowing and cutting collecting machine comprising a housing having a deflector portion formed with a regular semitoroidal internal surface, said surface being circumferentially continuous and of uniform radial width and contour, a blade, means mounting said blade for rotation about the major housing axis, and means for rotating said blade, said blade including means for circulating air and cuttings around the internal surface of said housing deflector portion, said deflector portion having a cut material discharge opening formed therein, said opening being disposed in the outer peripheral half of said housing deflector portion, the center of said opening being circumferentially displaced from the forward mid-point of the housing and disposed adjacent the terminal boundary of the first quadrant of said housing deflector portion, the edge of said opening being circumferentially continuous, and means for mounting a collecting bag on said deflector portion for receiving cuttings blown out of said discharge opening.

References Cited by the Examiner
UNITED STATES PATENTS

| | | | |
|---|---|---|---|
| 3,049,853 | 8/62 | Horner et al. | 56—25.4 |
| 3,085,386 | 4/63 | Slemmons | 56—25.4 |

FOREIGN PATENTS

| | | |
|---|---|---|
| 719,484 | 2/59 | Canada. |

T. GRAHAM CRAVER, *Primary Examiner.*

CARL W. ROBINSON, ARNOLD RUEGG, *Examiners.*